July 9, 1940.     P. F. HAWLEY     2,206,893
METHOD AND APPARATUS FOR LOGGING WELLS
Filed July 7, 1939     2 Sheets-Sheet 1

INVENTOR
*Paul F. Hawley*
BY
*Geo. L. Parkhurst*
ATTORNEY

July 9, 1940.   P. F. HAWLEY   2,206,893
METHOD AND APPARATUS FOR LOGGING WELLS
Filed July 7, 1938   2 Sheets-Sheet 2

INVENTOR
Paul F. Hawley
BY
ATTORNEY

Patented July 9, 1940

2,206,893

UNITED STATES PATENT OFFICE 2,206,893

METHOD AND APPARATUS FOR LOGGING WELLS

Paul F. Hawley, Tulsa, Okla., assignor to Stanolind Oil and Gas Company, Tulsa, Okla., a corporation of Delaware Application July 7, 1938, Serial No. 217,884

20 Claims. (Cl. 125—182)

This invention relates to the logging of wells and particularly to the electrical determination of the location of the various formations traversed thereby. More specifically this invention relates to a method and apparatus for measuring the distribution of an electrical current passing transversely across a well or bore hole at various levels therein.

Various methods for the logging of wells are known which involve the measurement of properties, usually electrical properties, of the geological beds penetrated by them. These measurements can be correlated for a number of wells in a given area so that indications are obtained as to the contours of the subsurface geological formations.

It is an object of my invention to provide a new method and apparatus for logging wells whereby a clear indication of the nature and depth of the earth formations traversed can be obtained. Another object is to provide a system for measuring the density of the electrical current passing through each of the beds penetrated by a well between distant electrodes. Further objects and advantages of my invention will become apparent as the description thereof proceeds.

In one of its broadest aspects my invention comprises passing an electrical current through the earth between electrodes on opposite sides of the well to be logged and measuring a function of the amount of this current per unit area which flows through the various strata transversely across the well. This can suitably be accomplished by measuring at various levels within the well the potential difference across two electrodes disposed along the path of current flow and having a fixed resistance between them. It is apparent from Ohm's law that under these conditions the potential difference between the electrodes varies in accordance with the current density, i. e., number of amperes per unit area, flowing through the earth and the well fluid at the electrode level. If the earth were homogeneous, the current density would of course very gradually, decreasing as the point of measurement is moved away from the shortest path of current flow, but since the various subsurface strata have different degrees of electrical conductivity, the current tends to concentrate in the more conductive of these strata. Accordingly the magnitude of the readings of potential across the electrodes is a measure of the conductivity of the stratum at the electrode level, and a log of the well is obtained by taking readings at a number of levels.

My invention can best be understood from the following detailed description read in conjunction with the drawings, in which.

Figures 1, 2:
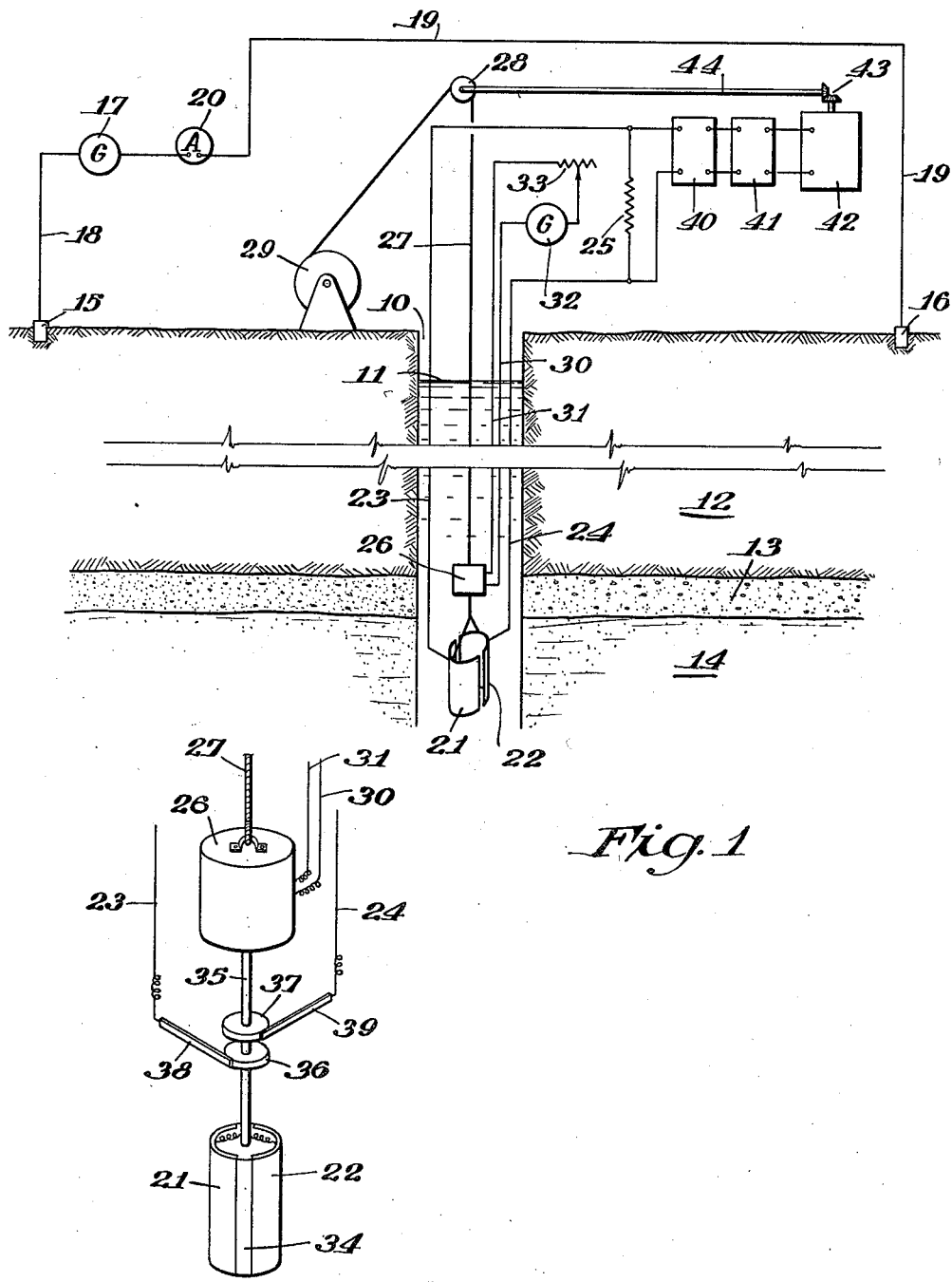
Figure 1 represents schematically one form of apparatus embodying my invention.
Figure 2 shows in more detail a preferred type of electrode arrangement.

Referring now to Figure 1, a well or bore hole 10 filled with a fluid 11 is shown which penetrates three formations 12, 13 and 14, formation 13 being assumed for purposes of illustration to be a relatively good conductor of electricity. Fluid 11 may suitably be water or drilling mud, and should be as homogeneous as possible. Electrodes 15 and 16 are placed in electrical contact with the earth on opposite sides of well 10, and are preferably spaced therefrom a distance at least equal to the depth to which the well 10 is to be surveyed. For shallow surveys this distance may be for example 1000 feet or less, while for deep surveys a greater distance is preferably used. Although electrodes 15 and 16 are shown at the surface of the earth, alternatively they can be lowered into other wells located a suitable distance from well 10, and also a plurality of electrodes may be used in place of either or each of the single electrodes shown. A source of electromotive force 17 is arranged to supply an electrical current to electrodes 15 and 16 by means of conductors 18 and 19, ammeter 20 being connected in the circuit so that the total current flow may be measured. The electrical current supplied by source of electromotive force 17 can be of the direct or alternating type, and source of electromotive force 17 may therefore suitably be a direct or alternating current generator. In general, alternating current having a frequency of about 20-100 cycles per second is preferred in order that polarization effects may be minimized, although the use of commutated direct current, i. e., periodically reversed direct current, is quite advantageous. It is apparent that by means of the apparatus described, I am able to pass an electrical current through the earth between electrodes 15 and 16, a portion of which flows transversely across well 10 and the fluid 11 therein throughout its depth in a direction substantially perpendicular thereto.

The two electrodes 21 and 22, which are adapted to be lowered into well 10, have conductors 23 and 24, respectively, leading therefrom to the top of the well, and have a fixed resistance 25 across them which can suitably be located at the top of the well 10 across conductors 23 and 24 as shown. Electrodes 21 and 22 preferably have rather extensive surfaces presented across the path of maximum current flow in order to obtain a relatively large potential across resistance 25 with relatively low current density, and can have a length of ten feet or more. It is also preferred to have the lateral surfaces of electrodes 21 and 22 curved and mounted upon insulating material so that the electrode assembly is approximately cylindrical and of a size which will fit with relatively small clearance into well 10. By using an electrode assembly which substantially fills the well area, the resistance between electrodes 21 and 22 through the well fluid, which in effect constitutes a shunt resistance across resistance 25, is maintained at a relatively high value as compared with the latter, so that any variation in the conductivity of the well fluid has only a very minor effect on the potential reading between the electrodes. The value of resistance 25 may range from about 1 to about 5 ohms and is preferably in the neighborhood of 2 ohms.

Since the maximum potential between electrodes 21 and 22 will be obtained when the maximum surface of either electrode is presented to the electrical current flowing through the earth and fluid 11, I can suspend these electrodes by suitable insulating means from drill pipe which is oriented to maintain the electrodes in this position and raise and lower them by means of the drill pipe so as to obtain a variation in potential between electrodes 21 and 22 due to the variations in electrical conductivity of the formations at various levels. This procedure, however, is quite slow, so that I greatly prefer to use apparatus of the type shown in Figure 1, in which electrodes 21 and 22 are suspended from and rotated about a common axis by a motor 26, which is in turn suspended within well 10 from cable 27 passing over a measuring spool 28 at the well head and wound upon drum 29. By rotating drum 29 in either direction in the conventional manner by suitable means (not shown), I am able to change the level of electrodes 21 and 22 within well 10 at will. In an alternative construction the electrode assembly can be provided with fins projecting at angles so that it will rotate when raised or lowered through the liquid column in the well, but I prefer to use a motor 26.

Motor 26 is shown by way of example as an electric motor operated by means of current supplied through conductors 30 and 31 by a source of electromotive force 32 and controlled by means of adjustable resistance 33. If desired motor 26 can be operated by source of electromotive force 17 by making suitable electrical connections. When electrodes 21 and 22 are rotated about a common axis by motor 26, the maximum electrode area is presented to the current passing through the earth twice in each revolution and a maximum potential between the electrodes is therefore obtained with the same frequency. The electrodes can be rotated at any suitable rate, provided that it is considerably less than the frequency of the current passed through the earth when alternating current is used, suitable rates ranging for example from about 25 to about 100 revolutions per minute.

My preferred well electrode assembly is shown in greater detail in Figure 2, in which electrodes 21 and 22 are metallic plates fixed to the surface of a core of insulating material 34 so that they are insulated from each other, and the assembly is in the form of an elongated cylinder. Shaft 35 is driven by motor 26 and is co-axial with and supports the electrode assembly. Mounted on shaft 35 are insulated collector rings 36 and 37 which are electrically connected to electrodes 21 and 22 by suitable means (not shown), and are also connected to conductors 23 and 24 by brushes 38 and 39, respectively. It is apparent that in practical operation only the electrodes 21 and 22 are allowed to come into contact with the well fluid and that a suitable protective casing may readily be provided by one skilled in the art.

Although for purposes of illustration I have shown cable 27 and conductors 23, 24, 30 and 31 separately extending from the electrode assembly to the top of the well, in practical operation a four-conductor cable capable of supporting the well equipment would be used.

Referring again to Figure 1, an amplifier 40, rectifier 41, and recording device 42 are connected to conductors 23 and 24 to obtain a record of the variations in potential between electrodes 21 and 22. Amplifier 40 can be of any conventional type and is used in order to increase the amplitude of the desired potential variations. Rectifier 41 is not absolutely essential to my invention and may therefore be omitted, but it is preferred because the records obtained are somewhat easier to interpret as will be pointed out below. Recording device 42 is a recording type of voltmeter which can be connected by means of gears 43 and shaft 44 to spool 28 so that the rate at which the recording medium is moved is proportional to that at which the electrode level within the well 10 is changed.

In logging a well according to my invention the electrode assembly including electrodes 21 and 22 and motor 26 is lowered through the fluid 11 while rotating and an electrical current is passed through the earth between electrodes 15 and 16. When direct current is used the potential between electrodes 21 and 22 varies in such manner that the record obtained by recorder 42 when rectifier 41 is omitted is approximately in the form of a sine wave due to the rotation of the electrodes in the well, and this type of record is shown in idealized form in Figure 3. The measure of current density at the electrode level is the amplitude of these sine waves and Figure 3 therefore represents a log in which the electrode has passed through formations having a relatively low conductivity with a formation of relatively high conductivity between them, e. g. formations 12, 13, and 14 of Figure 1.

Figure 4:
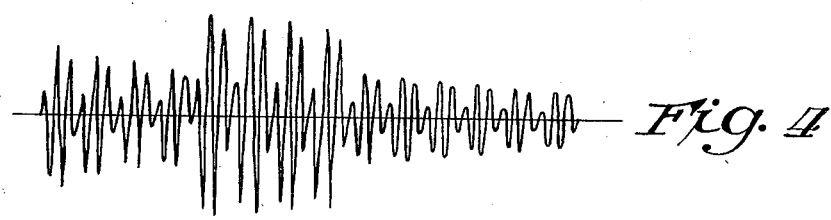
Figure 4 shows an idealized record which may be obtained using alternating current.

When alternating current is used, the type of record shown in Figure 4 is obtained, and this for purposes of illustration represents a log of the same combination of formations using an alternating current having a frequency only three times the rate of rotation of the electrodes. Obviously the frequency used will ordinarily be many times that of the rate of rotation of the electrodes and the envelope of the maximum amplitudes of the traces will more nearly correspond to that of two sine waves out of phase by 180°.

Figure 3:
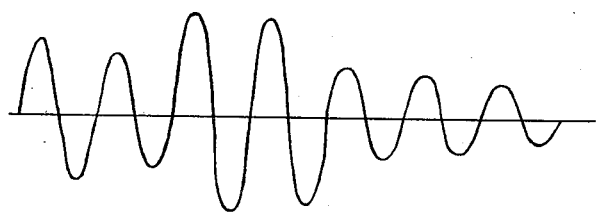
Figure 3 shows in idealized form one type of record which may be obtained using direct current.
Figure 5:
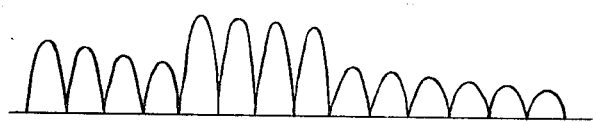
Figures 5 and 6 shows the effect of rectification on the records of Figures 3 and 4, respectively.
Figure 6:
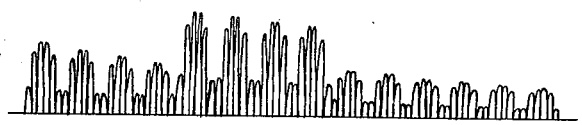

If rectifier 41 is interposed between amplifier 40 and recorder 42 the records for the same combination of formations using direct and alternating current, respectively, will appear as shown in Figures 5 and 6, and it will be noted that they are much easier to interpret than those shown in Figures 3 and 4 because there are twice as many maxima on one side of the axis.

In any logging operation carried out in accordance with my invention, electrodes 21 and 22 can be continuously lowered or raised and a continuous record made, or a log can be made in both directions in order to check results. Alternatively the logs can be made intermittently at definite intervals of depth or of time, and in the latter case a record of the depth of the electrode assembly as indicated on measuring spool 28 at reading times must be kept. It is not essential that instrument 42 be a recorder, but some of the advantages of my invention are retained if an indicating instrument is used.

While I have described my invention in connection with certain specific embodiments thereof, I do not desire to be limited thereto, but only by the following claims, which should be construed as broadly as the prior art will permit.

I claim:

1. The method of logging earth formations traversed by a well comprising passing an electrical current through the earth between points on either side of said well whereby said current flows transversely across said well at various levels therein, and measuring the density of the portion of said current flowing across said well at a given level.

2. The method of logging earth formations traversed by a well comprising passing an electrical current through the earth between distant electrodes on opposite sides of said well, and measuring the density of the portion of said current flowing at various levels within said well.

3. The method of logging earth formations traversed by a fluid-containing well comprising passing an electrical current through the earth between distant electrodes on opposite sides of said well, and continuously measuring the current density at various levels within said well.

4. The method of logging earth formations traversed by a fluid-containing well comprising passing an electrical current through the earth between distant electrodes on opposite sides of said well, producing electrical variations responsive to the current density at various levels within said well, and recording said electrical variations.

5. The method of claim 4 wherein said electrical current is of the alternating current type.

6. The method of logging earth formations traversed by a fluid-containing well which comprises passing an electrical current through the earth between distant points on opposite sides of said well whereby said current flows transversely across said well at various levels therein, changing the level of a pair of electrodes having extensive surfaces substantially horizontally spaced within said well, said electrodes being aligned with the path of flow of said current and having a circuit including a fixed resistance connecting them, and measuring the potential difference across said fixed resistance.

7. The method of logging earth formations traversed by a fluid-containing well comprising passing an electrical current through the earth between distant electrodes on opposite sides of said well, changing the level of a pair of rotating electrodes within said well, said pair of rotating electrodes being at substantially the same depth and having a circuit including a fixed resistance connecting them, and measuring the potential difference across said fixed resistance.

8. The method of claim 7 wherein said electrical current is alternating current having a frequency at least five times the rate of rotation of said pair of electrodes.

9. The method of logging earth formations traversed by a fluid-containing well which comprises passing an electrical current through the earth between distant electrodes on opposite sides of said well, continuously changing the level of a pair of rotating electrodes within said well, said pair of rotating electrodes being at substantially the same depth and having a circuit including a fixed resistance connecting them, producing electrical variations responsive to the potential difference across said fixed resistance, recording said electrical variations on a recording medium, and moving said recording medium at a rate proportional to that at which the level of said pair of rotating electrodes is changing.

10. The method of logging earth formations according to claim 9 which includes the steps of amplifying and rectifying said electrical variations prior to said recording step.

11. Apparatus for logging earth formations traversed by a well comprising means for passing an electrical current through the earth between points on opposite sides of said well, and means for measuring the density of the portion of said electrical current flowing across said well at various levels therein.

12. Apparatus for logging earth formations traversed by a well comprising at least two grounded electrodes at a distance from said well and on opposite sides thereof, means for passing an electrical current through the earth between said electrodes, and means for measuring the current density at various levels within said well.

13. Apparatus for logging earth formations traversed by a fluid-containing well comprising means for passing an electrical current through the earth between points on opposite sides of said well whereby said current flows transversely across said well at various levels therein, a pair of substantially horizontally spaced electrodes having extensive surfaces adapted to be lowered into said well and aligned with the path of flow of said current, means for changing the level of said pair of electrodes within said well, a circuit having a substantially constant resistance connecting said pair of electrodes, and means for measuring the potential difference across said resistance.

14. Apparatus for logging earth formations traversed by a fluid-containing well comprising means for passing an electrical current through the earth between points on opposite sides of said well, a pair of electrodes within said well, said electrodes being at substantially the same depth and adapted to be rotated, means for changing the level of said pair of electrodes within said well, a circuit having a substantially constant resistance connecting said pair of electrodes, and means for measuring the current flowing in said circuit.

15. Apparatus for logging earth formations traversed by a fluid-containing well comprising means for passing an electrical current through the earth between points on opposite sides of said well, a pair of electrodes within said well, said electrodes being at substantially the same depth, means for changing the level of said pair of electrodes within said well, means for rotating said electrodes about a common axis, a circuit including a fixed resistance connecting said electrodes, means for producing electrical variations responsive to the potential difference across said resistance, and means for recording said electrical variations.

16. Apparatus for logging earth formations traversed by a fluid-containing well comprising means for passing an electrical current through the earth between points on opposite sides of said well, a pair of electrodes within said well, said electrodes being at substantially the same depth and having extensive surfaces, means for changing the level of said pair of electrodes in said well, means for rotating said electrodes about a common axis, a circuit including a fixed resistance connecting said electrodes, means for producing electrical variations responsive to the potential difference across said resistance, means for rectifying said electrical variations, and means for recording said rectified electrical variations.

17. Apparatus according to claim 16 wherein said electrical current is alternating current having a frequency at least five times the rate of rotation of said pair of electrodes.

18. Apparatus according to claim 16 including means for synchronizing said level-changing means and said recording means.

19. Apparatus according to claim 16 including means for amplifying said electrical variations.

20. Apparatus for logging earth formations traversed by a well comprising at least two grounded electrodes at a distance from said well and on opposite sides thereof, means for passing an alternating current through the earth between said electrodes, an electrode system within said well including a pair of electrodes having extensive surfaces, and means for rotating said electrodes at a relatively slow rate compared with the frequency of said alternating current, means for changing the level of said electrode system within said well, a circuit including a fixed resistance connecting said pair of electrodes, means for producing electrical variations responsive to the potential difference across said resistance, means for transmitting said electrical variations to the top of said well, means for amplifying and rectifying said electrical variations at the top of said well, and means for recording said rectified electrical variations.

PAUL F. HAWLEY.